United States Patent
Cillessen et al.

(10) Patent No.: US 12,503,229 B2
(45) Date of Patent: Dec. 23, 2025

(54) INTERNAL ROTATING FAST-ROPE SYSTEM AND METHOD

(71) Applicant: Bell Textron Inc., Fort Worth, TX (US)

(72) Inventors: Craig Cillessen, Dallas, TX (US); Marco Bayerlein, Munich (DE); Ansgar Hannes Baisch, Wain (DE); Ralf Kassner, Bielefeld (DE)

(73) Assignee: Textron Innovations Inc., Providence, RI (US)

( * ) Notice: Subject to any disclaimer, the term of this patent is extended or adjusted under 35 U.S.C. 154(b) by 1191 days.

(21) Appl. No.: 17/184,270

(22) Filed: Feb. 24, 2021

(65) Prior Publication Data

US 2022/0267005 A1 Aug. 25, 2022

(51) Int. Cl.
*B64D 9/00* (2006.01)
*A62B 1/06* (2006.01)

(52) U.S. Cl.
CPC . *B64D 9/00* (2013.01); *A62B 1/06* (2013.01)

(58) Field of Classification Search
CPC .... B64D 9/00; B64D 1/22; B64D 1/02; A62B 1/06; A63B 69/004; A63B 7/00; B60N 3/023; A47K 17/024; A47K 17/022; A47K 17/02; B66C 1/22; B66C 5/02
See application file for complete search history.

(56) References Cited

U.S. PATENT DOCUMENTS

| | | | | |
|---|---|---|---|---|
| 1,372,853 A | * | 3/1921 | Wellen | A62B 1/14 188/65.2 |
| 1,474,457 A | * | 11/1923 | Weinberg | B64D 1/22 123/195 A |
| 1,851,305 A | * | 3/1932 | Fisher | B64D 1/22 258/1.6 |
| 1,999,777 A | * | 4/1935 | Palmer | B64D 1/22 244/30 |
| 2,151,395 A | * | 3/1939 | Smith | B64D 1/22 258/1.4 |
| 2,437,619 A | * | 3/1948 | Setz | B64D 1/22 258/1.2 |
| 2,505,707 A | * | 4/1950 | DuPont | B64D 1/22 57/200 |
| 2,738,939 A | * | 3/1956 | Johnson | B64D 1/22 441/83 |
| 2,748,855 A | * | 6/1956 | Siems | B64C 1/1415 160/180 |
| 2,817,095 A | * | 12/1957 | Jeffries | A47K 3/003 4/576.1 |

(Continued)

*Primary Examiner* — Daniel P Cahn
*Assistant Examiner* — Shiref M Mekhaeil
(74) *Attorney, Agent, or Firm* — Bradley Arant Boult Cummings LLP

(57) ABSTRACT

A fast-rope system for use with a rotary aircraft includes a tubular housing attached to an interior portion of a cabin and adjacent to an upper portion of an exit door opening of the rotary aircraft and a fast-rope frame structure rotatably coupled to the tubular housing. The fast-rope frame structure includes a cylindrical pipe contained partially within the tubular housing and operable to rotate within the tubular housing and a cantilever beam structure fixedly connected to the cylindrical pipe and configured to have a fast rope attached thereto and move in response to rotation of the cylindrical pipe within the tubular housing.

15 Claims, 4 Drawing Sheets

(56) References Cited

U.S. PATENT DOCUMENTS

| | | | | |
|---|---|---|---|---|
| 3,008,377 A * | | 11/1961 | Bronson | B64D 1/04 294/82.26 |
| 3,088,608 A * | | 5/1963 | Theodore | B64D 1/22 212/75 |
| 3,117,749 A * | | 1/1964 | Angel | B64C 27/54 244/17.17 |
| 3,336,060 A * | | 8/1967 | Bradford | A61G 1/003 5/8 |
| 3,358,968 A * | | 12/1967 | Walsh | B64D 1/22 254/299 |
| 3,416,757 A * | | 12/1968 | Maraghe | B64C 1/1415 244/129.5 |
| 3,426,367 A * | | 2/1969 | Bradford | A61G 1/013 5/628 |
| 3,718,171 A * | | 2/1973 | Godwin | B64C 1/1415 244/129.5 |
| 3,823,901 A * | | 7/1974 | Holmes | B64D 1/02 244/118.1 |
| 3,961,809 A * | | 6/1976 | Clugston | B60R 3/02 280/166 |
| 4,082,266 A * | | 4/1978 | Elkins | A63B 5/20 482/7 |
| 4,106,729 A * | | 8/1978 | Bergman | B64D 25/14 193/25 B |
| 4,437,196 A * | | 3/1984 | Louis | A61G 7/1017 4/564.1 |
| 4,473,201 A * | | 9/1984 | Barnes | B64C 1/1415 292/216 |
| 4,497,462 A * | | 2/1985 | Hamatani | B64C 1/1415 244/129.5 |
| 4,510,714 A * | | 4/1985 | Kasper | B64C 1/1415 49/249 |
| 4,512,570 A * | | 4/1985 | Tardivel | A63B 7/04 482/37 |
| 4,560,123 A * | | 12/1985 | Sealey | B64C 1/143 244/129.5 |
| 4,609,167 A * | | 9/1986 | Dean | B64D 1/22 244/17.11 |
| 4,750,691 A * | | 6/1988 | Hollrock | B64C 1/22 244/137.1 |
| 4,844,448 A * | | 7/1989 | Niznik | A63B 21/4047 482/40 |
| 4,858,855 A * | | 8/1989 | Dalbera | B64C 1/22 212/323 |
| 4,984,757 A * | | 1/1991 | Hartung | B64D 1/22 56/235 |
| 5,064,147 A * | | 11/1991 | Noble | B64C 1/1407 292/DIG. 31 |
| 5,076,515 A * | | 12/1991 | Goon | B64D 9/00 414/471 |
| 5,190,250 A * | | 3/1993 | DeLong | B64D 1/22 244/17.11 |
| 5,191,370 A * | | 3/1993 | Bozzolato | H04N 13/239 396/419 |
| 5,209,435 A * | | 5/1993 | Edwards | A62B 1/00 105/8.1 |
| 5,531,403 A * | | 7/1996 | Tyler | B64D 47/08 244/118.1 |
| 5,558,608 A * | | 9/1996 | Hall | A63B 21/4035 482/904 |
| 5,590,440 A * | | 1/1997 | Pelt | A47K 17/024 16/342 |
| 5,651,584 A * | | 7/1997 | Chenot | B60N 2/667 297/284.4 |
| 5,931,415 A * | | 8/1999 | Lingard | B64C 1/143 74/105 |
| 6,131,213 A * | | 10/2000 | Sarff | A47K 3/003 248/251 |
| 6,334,590 B1 * | | 1/2002 | Landry | B64D 1/22 244/137.1 |
| 6,508,743 B1 * | | 1/2003 | Fortin | A63B 1/00 482/40 |
| 6,932,744 B1 * | | 8/2005 | Ford | A63B 5/00 434/257 |
| 7,216,740 B2 * | | 5/2007 | Dierkes | B64D 25/06 244/151 R |
| D633,961 S * | | 3/2011 | Loew | D21/679 |
| 8,047,583 B2 * | | 11/2011 | Clausen | E05B 13/00 244/129.1 |
| 8,292,229 B2 * | | 10/2012 | Pancotti | B64D 9/00 244/17.11 |
| 8,490,923 B2 * | | 7/2013 | Bosqueiro | B66C 5/02 212/181 |
| 8,888,048 B2 * | | 11/2014 | Figoureux | B64D 1/22 294/82.26 |
| 8,925,858 B2 * | | 1/2015 | Spiral | B64F 1/125 244/116 |
| 9,114,876 B1 * | | 8/2015 | Cockell, II | B64D 9/00 |
| 9,452,308 B2 * | | 9/2016 | Lentz | A63B 21/1627 |
| 9,943,710 B1 * | | 4/2018 | Cooper | A62B 35/0075 |
| 11,465,730 B2 * | | 10/2022 | Romec | B64C 1/1415 |
| 12,037,819 B2 * | | 7/2024 | Samuelson | E05B 15/004 |
| 12,037,832 B2 * | | 7/2024 | Skilton | B64C 1/20 |
| 2006/0053547 A1 * | | 3/2006 | Farrow | A47K 17/024 4/576.1 |
| 2010/0044156 A1 * | | 2/2010 | Tkebuchava | B64D 1/22 182/231 |
| 2011/0084578 A1 * | | 4/2011 | Newkirk | A61G 7/1038 211/96 |
| 2011/0147531 A1 * | | 6/2011 | Bosqueiro | B66D 3/20 244/137.1 |
| 2012/0094808 A1 * | | 4/2012 | Leier | A63B 23/1227 482/40 |
| 2013/0048784 A1 * | | 2/2013 | Headrick | B64D 11/0007 244/118.6 |
| 2015/0014483 A1 * | | 1/2015 | Minchau | B64C 1/1461 244/129.5 |
| 2015/0148197 A1 * | | 5/2015 | Lentz | A63B 21/1618 482/40 |
| 2016/0166874 A1 * | | 6/2016 | Sheeler | A63B 1/00 482/40 |
| 2016/0368605 A1 * | | 12/2016 | Behrens | F16M 13/02 |
| 2016/0376006 A1 * | | 12/2016 | Balten | B64C 27/04 244/137.2 |
| 2018/0304103 A1 * | | 10/2018 | Cooper | A62B 1/10 |
| 2022/0071456 A1 * | | 3/2022 | Meyers | A47K 3/12 |
| 2022/0144434 A1 * | | 5/2022 | Benedik | B64D 1/22 |
| 2023/0249826 A1 * | | 8/2023 | Mallonee | B64C 1/143 182/106 |

* cited by examiner

INTERNAL ROTATING FAST-ROPE SYSTEM AND METHOD

TECHNICAL FIELD

The present disclosure relates generally to an internal rotating fast-rope system and method and more particularly, but not by way of limitation, to an internal rotating fast-rope system and method implemented on a rotary aircraft for rapid deployment of personnel from the rotary aircraft.

BACKGROUND

This section provides background information to facilitate a better understanding of the various aspects of the disclosure. It should be understood that the statements in this section of this document are to be read in this light and not as admissions of prior art.

Fast-roping is a term used to describe a technique that can be used to descend a thick rope. The technique is often employed to deploy individuals, such as troops, from a rotary aircraft while the rotary aircraft is in locations where the rotary aircraft is not able to touch down. Fast-roping is often used by Marines who utilize fast-roping to board a ship at sea or to access a land destination. In comparison to rappelling, fast-roping is generally considered to be more dangerous although it is often faster. This is often the case if a fast-roping individual is heavily loaded. This is because in fast-roping, the rope is not attached to the individual with a descender as is the case with rappelling.

In a typical fast-roping technique, an individual grasps the rope with gloved hands and slides down the rope using hands, legs, and feet to control descent. Several individuals can descend on the same rope in sequence with a plurality of them on the rope at the same time so long as each one has sufficient time to move out of the way upon reaching the ground, ship, or other surface.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A fast-rope system for use with a rotary aircraft includes a tubular housing attached to an interior portion of a cabin and adjacent to an upper portion of an exit door opening of the rotary aircraft and a fast-rope frame structure rotatably coupled to the tubular housing. The fast-rope frame structure includes a cylindrical pipe contained partially within the tubular housing and operable to rotate within the tubular housing and a cantilever beam structure fixedly connected to the cylindrical pipe and configured to have a fast rope attached thereto and move in response to rotation of the cylindrical pipe within the tubular housing.

A fast-rope system for use with a rotary aircraft includes a housing attached to an interior portion of a cabin of the rotary aircraft and a fast-rope frame structure rotatably coupled to the housing. The fast-rope frame structure includes a pipe contained operable to rotate within the tubular housing and a cantilever beam structure fixedly connected to the pipe and configured to have a fast rope attached thereto and move in response to rotation of the cylindrical pipe within the tubular housing. The fast-rope system also includes a locking mechanism operable to lock the cantilever beam structure into a plurality of positions relative to the tubular housing.

A method for fast-rope attachment and deployment from a rotary aircraft utilizing a fast-rope system comprising a cantilever beam structure includes a locking mechanism of a fast-rope system unlocking from a stowed position, a cantilever beam structure of the fast-rope system moving to an intermediate position between the stowed position and an operation position, an attachment point of the cantilever beam structure receiving a fast rope into a fixed connection, the cantilever beam structure moving to the operation position, and the locking mechanism locking into the operation position.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Maintaining aerodynamic characteristics of a rotary aircraft and maximizing cabin space while providing a fast-rope system that can be rapidly deployed is a problem that prior systems have not adequately solved. Current internal fast-rope systems take up too much cabin space. Current external fast-rope systems that are mounted outside the cabin space can impair the flight characteristics of rotary aircraft on which they are employed.

Figure 1:
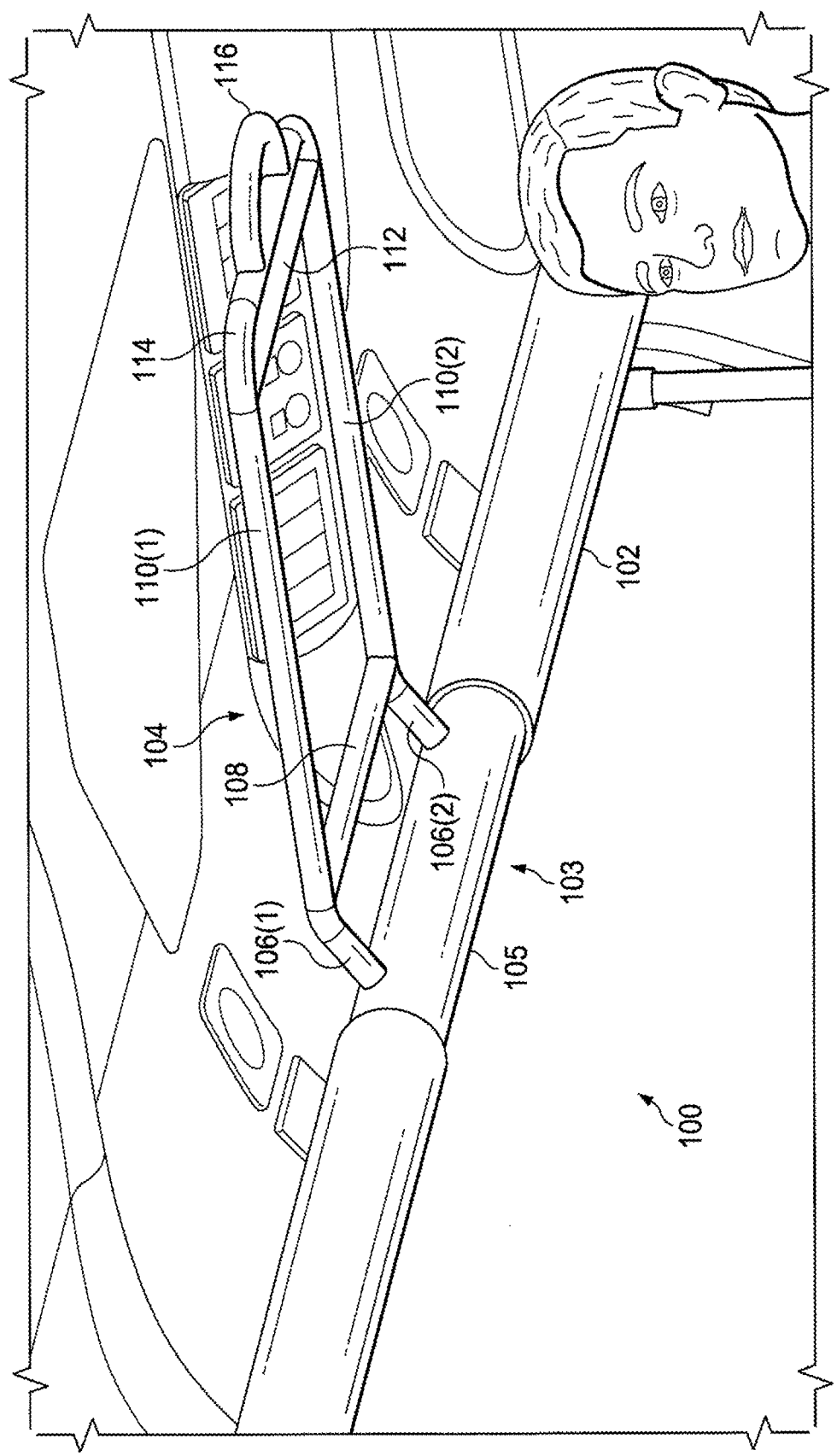
FIG. 1 illustrates a fast-rope system in a stowed position inside a cabin of a rotary aircraft.

FIG. 1 illustrates a fast-rope system 100 in a stowed position inside a cabin of a rotary aircraft. The fast-rope system 100 includes a tubular housing 102 and a fast-rope frame structure 103 coupled to the tubular housing 102. The tubular housing 102, in a typical embodiment, is mounted adjacent to an upper portion of an exit door opening of the rotary aircraft and has a primary axis substantially perpendicular to an axis defined by a primary direction of egress through the exit door opening.

In a typical embodiment, the tubular housing 102 is circular in cross-section and is dimensioned so as to allow a cylindrical pipe 105 of the fast-rope frame structure 103 to rotate about the primary axis of the tubular housing 102 within the tubular housing 102. Although the tubular housing 102 and the cylindrical pipe 105 are both shown as being cylindrical in shape, this need not be the case in all embodiments. In most embodiments, the tubular housing 102 and the cylindrical pipe 105 are coaxial to one another. The cylindrical pipe 105 may be internally hollow, solid, or have other internal structure as dictated by design considerations.

The fast-rope frame structure 103 also includes a cantilever beam structure 104 that extends from the cylindrical pipe 105. The cantilever beam structure 104 may be rotated inside and outside of the exit door opening of the rotary aircraft by virtue of the fact that the cantilever beam structure 104 is coupled to the cylindrical pipe 105 of the fast-rope frame structure 103 and rotates in a plane perpendicular to the primary axis of the cylindrical pipe 105 when the cylindrical pipe 105 itself rotates about the primary axis.

The cantilever beam structure 104 includes a pair of parallel attachment beams 106(1) and 106(2) that are coupled to the cylindrical pipe 105 perpendicular to the primary axis of the cylindrical pipe 105. A cross beam 108 is illustrated as connecting ends of the parallel attachment beams 106(1) and 106(2) to one another opposite the cylindrical pipe 105 and providing structural support thereto.

Also shown are a pair of parallel extended beams 110(1) and 110(2) that extend from the parallel attachment beams 106(1) and 106(2), respectively, and extend in a direction perpendicular to the primary axis of the cylindrical pipe 105. As illustrated in FIG. 1, an obtuse angle is formed between the parallel attachment beams 106(1) and 106(2) and the respective parallel extended beams 110(1) and 110(2) so that when the fast-rope system 100 is in the stowed position, the cantilever beam structure 104 is close to the ceiling of the rotary aircraft and does not unnecessarily consume space within an interior thereof.

A cross beam 112 is illustrated at an opposite end of each of the parallel extended beams 110(1) and 110(2). In similar fashion to the cross beam 108, the cross beam 112 is illustrated as connecting ends of the parallel extended beams to one another and providing structural support thereto. Also shown is a loop-attachment beam 114 that is substantially parallel to the cross beam 112. The loop-attachment beam 114 provides additional structural support to the fast-rope frame structure 103 and also serves as an attachment point for a fast-rope attachment loop 116. In a typical embodiment, the fast-rope attachment loop 116 is formed as a semi-circular bar that allows for attachment of a fast rope and minimizes sliding and other movement of the attachment point for the fast rope during fast-rope operations.

The fast-rope system 100 may be locked into position in the stowed position in which the entire fast-rope frame structure 103 is within the cabin of the rotary aircraft and the cantilever beam structure 104 is close to the ceiling of the cabin of the rotary aircraft. In similar fashion, the fast-rope system 100 may be locked into an operation position in which at least a portion of the cantilever beam structure 104 is outside the rotary aircraft such that fast-rope operations, including descent of individuals via a fast rope, can be accomplished. Other intermediate locking positions between the stowed position and the operation position are also contemplated in accordance with particular design considerations. Locking mechanism may include, for example, spring pins.

Figure 2:
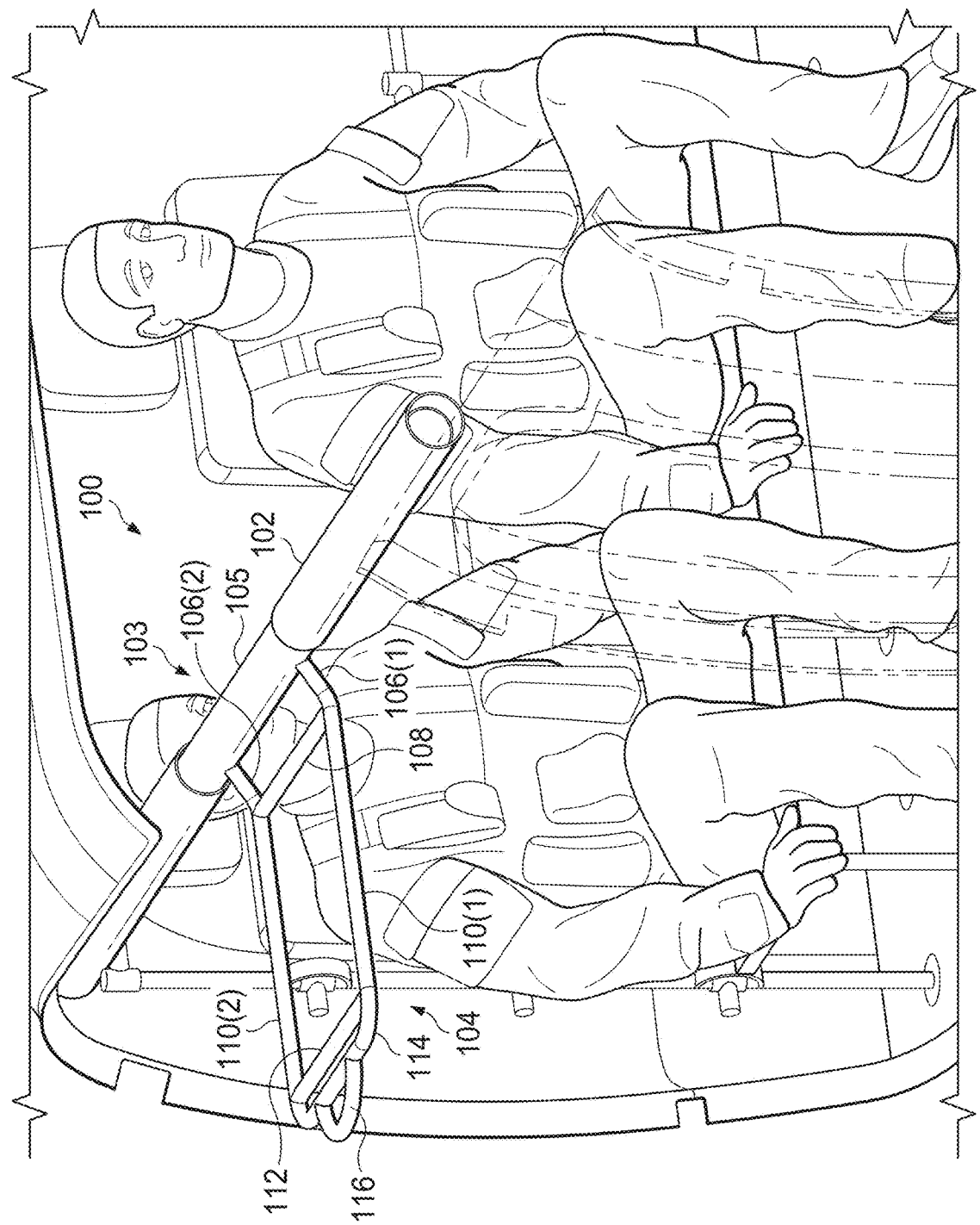
FIG. 2 illustrates the fast-rope system of FIG. 1 in an operation position.

FIG. 2 illustrates the fast-rope system 100 in the operation position. As noted above, in the operation position, fast-rope operations, including descent of individuals via a fast rope, can be accomplished. In the operation position, at least a portion of the cantilever beam structure is positioned outside the cabin of the rotary aircraft. In a typical embodiment, in the operation position, a primary axis of the cantilever beam structure 104 is substantially parallel to a surface to which individuals to be performing a fast-rope operation from the rotary will descend. In a typical embodiment, a fast rope, including a hook or other attachment mechanism, is attached to the cantilever beam structure 104, for example, at the fast-rope attachment loop 116, before the fast-rope system 100 is rotated into the operation position as shown in FIG. 2. The fast rope can, for example, be attached to the cantilever beam structure 104 while the fast-rope system 100 is in the stowed position or at an intermediate position between the stowed position and the operation position. When the fast-rope system 100 is locked into the operation system and a fast rope has been attached thereto, descent of individuals in a fast-rope operation may commence.

Figure 3:
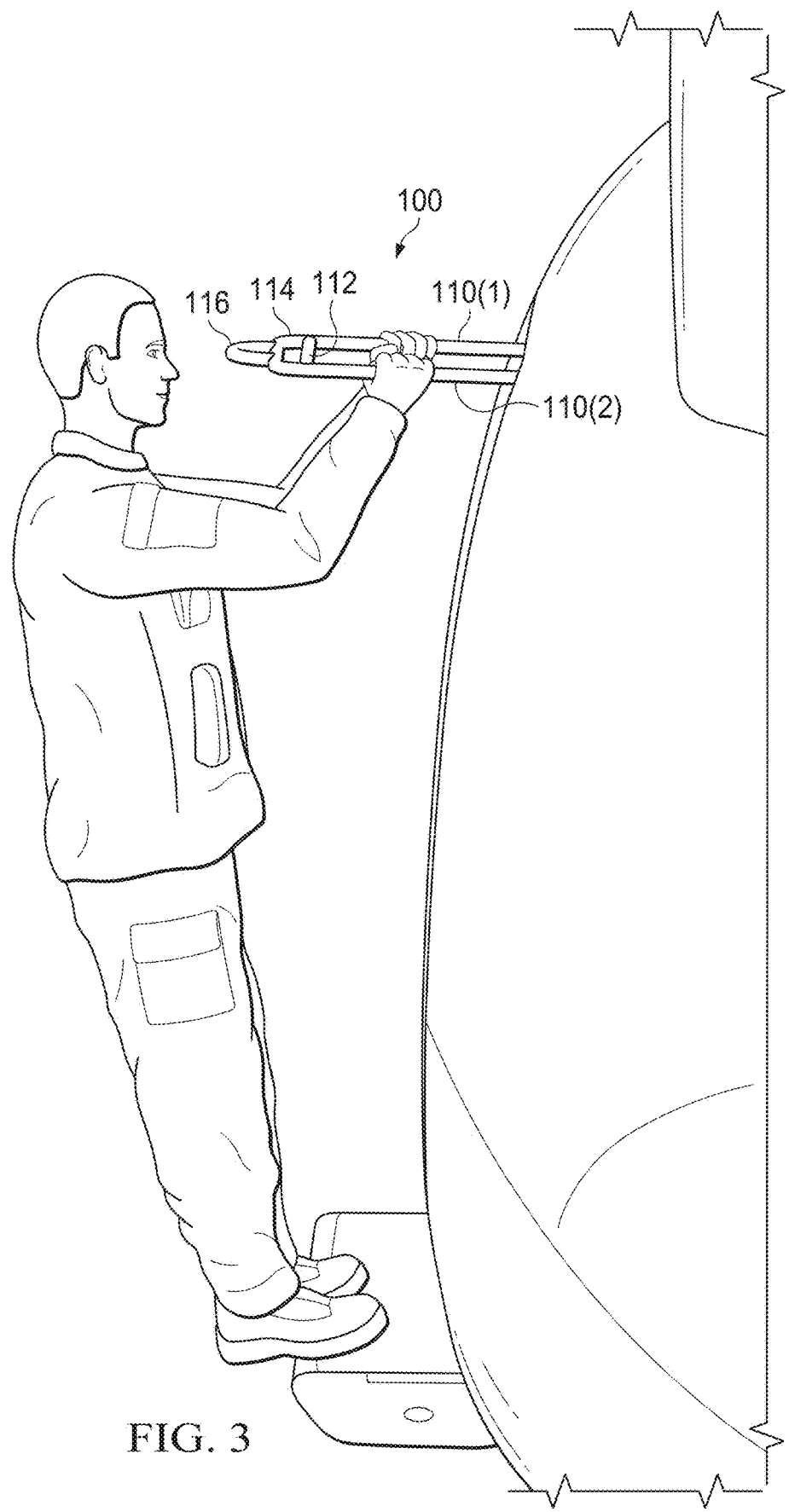
FIG. 3 illustrates the fast-rope system of FIG. 1 in the operation position with an individual standing outside the cabin of a rotary aircraft.

FIG. 3 illustrates the fast-rope system 100 in the operation position with an individual standing outside the cabin of the rotary aircraft. A horizontal (i.e., substantially parallel to a surface to which the individual will descend via the fast rope) dimension of the cantilever beam structure 104 is such that a terminal end (e.g., the fast-rope attachment loop 116) extends beyond an outermost portion of the rotary aircraft beneath a rotor of the rotary aircraft and in the direction of egress out of the exit door opening of the rotary aircraft. In FIG. 2, the outermost portion is a step extending from a fuselage of the rotary aircraft. Those having skill in the art will appreciate that such a horizontal dimension facilitates extension of the fast rope in a way that interference with the fast rope by structure of the rotary aircraft can be minimized.

Figure 4:
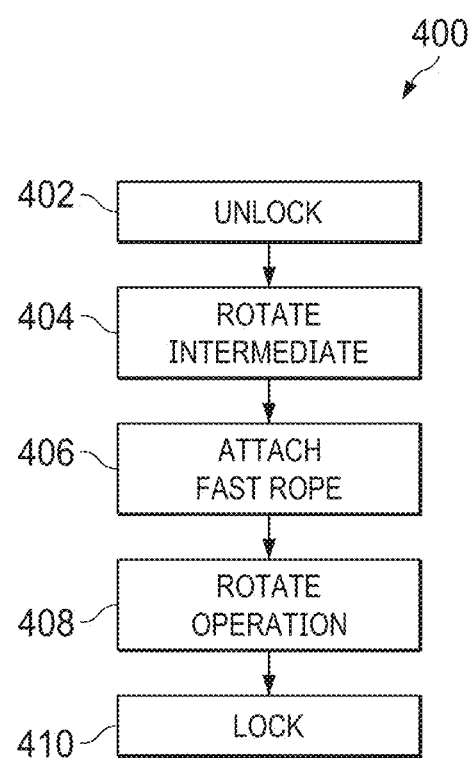
FIG. 4 is a flow diagram that illustrates a method of operation of a fast-rope system such as, for example, the fast-rope system illustrated in FIGS. 1-3.

FIG. 4 is a flow diagram that illustrates a method of operation of a fast-rope system such as, for example, the fast-rope system 100 illustrated in FIGS. 1-3. A flow 400 begins at step 402. At step 402, the fast-rope system is unlocked from the stowed position. From step 402, execution proceeds to step 404. At step 404, the fast-rope system is rotated into an intermediate position in which an attachment point (e.g., the fast-rope attachment loop 116) of the fast-rope system is within the cabin of the rotary aircraft.

From step 404, execution proceeds to step 406. At step 406, a fast rope is attached to the fast-rope system. From step 406, execution proceeds to step 408. At step 408, the fast-rope system is rotated so that the attachment point is outside the cabin of the rotary aircraft in the operation position. From step 408, execution proceeds to step 410. At step 410, the fast-rope system is locked into the operation position so that descent of individuals via the fast-rope system can commence. Although step 406 is listed above and shown in FIG. 4 as occurring after step 404, those having skill in the art will appreciate that, in some embodiments, step 406 could be performed be performed before step 402 or between steps 402 and 404.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A fast-rope system for use with a rotary aircraft, the fast-rope system comprising:
    a tubular housing attached to an interior portion of a cabin and adjacent to an upper portion of an exit door opening of the rotary aircraft; and
    a fast-rope frame structure rotatably coupled to the tubular housing, the fast-rope frame structure comprising:
        a cylindrical pipe contained partially within the tubular housing and operable to rotate within the tubular housing; and
        a cantilever beam structure having a first end fixedly connected to the cylindrical pipe and a second end distal from the first end; and
    a fast rope attached to an attachment point of the cantilever beam structure, the attachment point being closer to the second end than the first end; and
    wherein the cantilever beam structure moves between a stowed position and an operation position in response to rotation of the cylindrical pipe within the tubular housing.

2. The fast-rope system of claim 1, wherein each of the stowed position and the operation position dependent on a rotational position of the cylindrical pipe.

3. The fast-rope system of claim 2, wherein, in the stowed position, a substantial portion of the cantilever beam structure is adjacent a ceiling of the cabin.

4. The fast-rope system of claim 2, wherein, in the operation position, an outermost portion of the cantilever beam structure is outboard of an outermost portion of the rotary aircraft beneath a rotor of the rotary aircraft.

5. The fast-rope system of claim 1, wherein the cantilever beam structure comprises an attachment loop for attachment of the fast rope thereto.

6. The fast-rope system of claim 1, wherein the tubular housing and the cylindrical pipe are coaxial.

7. The fast-rope system of claim 1, wherein the cantilever beam structure comprises:
    a pair of beams interoperably coupled to the cylindrical pipe; and
    a loop-attachment beam connected between the pair of beams.

8. The fast-rope system of claim 7, wherein the cantilever beam structure comprises a fast-rope attachment loop connected to the loop-attachment beam.

9. A fast-rope system for use with a rotary aircraft, the fast-rope system comprising:
    a tubular housing attached to an interior portion of a cabin of the rotary aircraft;
    a fast-rope frame structure rotatably coupled to the tubular housing, the fast-rope frame structure comprising:
        a pipe operable to rotate within the tubular housing; and
        a rigid cantilever beam structure fixedly connected to the pipe; and
    a fast rope attached to an attachment point of the rigid cantilever beam structure opposite a connection point of the rigid cantilever beam structure to the pipe;
    wherein the cantilever beam structure rotates in response to rotation of the cylindrical pipe within the tubular housing.

10. The fast-rope system of claim 9, wherein the fast-rope frame structure is positionable in a stowed position and an operation position, each of the stowed position and the operation position dependent on a rotational position of the pipe.

11. The fast-rope system of claim 10, wherein, in the stowed position, a substantial portion of the cantilever beam structure is adjacent a ceiling of the cabin.

12. The fast-rope system of claim 10, wherein, in the operation position, an outermost portion of the cantilever frame structure is outboard of an outermost portion of the rotary aircraft beneath a rotor of the rotary aircraft.

13. The fast-rope system of claim 9, wherein the cantilever beam structure comprises an attachment loop for attachment of the fast rope thereto.

14. The fast-rope system of claim 9, wherein the housing and the pipe are coaxial.

15. The fast-rope system of claim 9, wherein the cantilever beam structure comprises:
    a pair of beams interoperably coupled to the pipe; and
    a loop-attachment beam connected between the pair of beams.

* * * * *